United States Patent [19]

Springer

[11] Patent Number: 4,494,125

[45] Date of Patent: Jan. 15, 1985

[54] DIFFERENTIAL-PERMEABILITY FIELD-CONCENTRATING MAGNETIC READ/WRITE HEAD

[75] Inventor: Gilbert D. Springer, Sunnyvale, Calif.

[73] Assignee: Ferix Corporation, Fremont, Calif.

[21] Appl. No.: 472,924

[22] Filed: Mar. 7, 1983

Related U.S. Application Data

[63] Continuation of Ser. No. 381,922, May 26, 1982, abandoned.

[51] Int. Cl.$^3$ .............................................. G01D 15/12

[52] U.S. Cl. .................................................... 346/74.5

[58] Field of Search ............................ 346/74.2, 74.5; 360/125, 126

[56] References Cited

U.S. PATENT DOCUMENTS 4,219,854 8/1980 Church et al. .................. 360/125 X 4,414,554 11/1983 Springer ............................ 346/74.5

*Primary Examiner*—Thomas H. Tarcza

*Attorney, Agent, or Firm*—Kolisch, Hartwell, Dickinson & Anderson

[57] ABSTRACT

A magnetic-image read/write head including inner and outer, substantially co-planar, symmetrically arranged pole portions. In one embodiment, the head is disclosed with the inner pole portion presenting a substantially full-circular facial expanse, and with the outer pole portion presenting an annular facial expanse surrounding that of the inner pole portion. In another embodiment, each of the two pole portions presents a substantially annular facial expanse with the inner pole being hollow. In both embodiments, the inner pole portion has a magnetic permeability which is significantly lower than that of the outer pole portion. An image unit written on a magnetic-image-storage medium by the head takes the form, generally, of a dot characterized by an appreciably larger magnetic field intensity adjacent its perimeter than inside the perimeter.

10 Claims, 6 Drawing Figures

DIFFERENTIAL-PERMEABILITY FIELD-CONCENTRATING MAGNETIC READ/WRITE HEAD

CROSS-REFERENCE TO RELATED APPLICATION

This is a continuation of my prior-filed application entitled DIFFERENTIAL-PERMEABILITY FIELD-CONCENTRATING MAGNETIC WRITING HEAD, filed May 26, 1982, Ser. No. 381,922, now abandoned.

BACKGROUND AND SUMMARY OF THE INVENTION

This invention pertains to a thin-film head for producing, in a magnetic image-storage medium, a high-resolution, smooth-edge-defining dot-like magnetic image unit, and for reading the same. More particularly, it relates to the production of a somewhat doughnut-shaped magnetized region in such a medium, which region functions as a portion of a total magnetic image, with magnetization in the region characterized by multi-directionally oriented magnetic vectors distributed generally with spherical geometry, and with a magnetic field intensity which is significantly higher adjacent the perimeter of the region than in the central portion of the region.

The heads which are disclosed herein are structurally similar to that which is illustrated in FIGS. 5 and 6 in my U.S. Pat. No. 4,414,554, issued Nov. 8, 1983, for MAGNETIC IMAGING APPARATUS, and in the same two figures in my Belgium Pat. No. 891.603, issued Jan. 15, 1982 for MAGNETIC IMAGING METHOD AND APPARATUS. The disclosure of that prior U.S. patent is hereby incorporated by reference in the instant disclosure. The head of the present invention, in one special form shown herein, constitutes an improvement over the head disclosed in the just-referenced U.S. patent in its ability, when writing, to distribute flux over the central portion of a written image. FIGS. 1 and 2, described below, are substantially the same as FIGS. 5 and 6 just-above mentioned. FIG. 5 herein shows a unique hollow-head structure which is the special head form just referred to.

As discussed in my patent relative to a printing application, edge definition in a finally printed image is a key factor in achieving clarity in images such as alphanumeric characters. Accordingly, a general object of the present invention is to provide a magnetic head having unique differential permeability characteristics which, when embodied in a geometric head structure like those disclosed herein and in my prior U.S. patent, contribute appreciably to enhanced edge definition in a finally printed image. Strong edge definition is also important in an image-reading operation.

According to the invention, the proposed thin-film head includes inner and outer, substantially co-planar, symmetrically arranged pole portions, with the inner pole portion having a magnetic permeability which is significantly lower (preferably by at least an order of magnitude) than that of the outer pole portion. In one embodiment disclosed herein, the head has an inner pole portion which includes a substantially full-circular exposed face, surrounded symmetrically by the outer pole portion which has a substantially annular exposed face.

In another embodiment, both pole portions have substantially annular exposed faces.

With the magnetic permeabilities of the inner and outer pole portions related as just generally described, magnetic flux produced by the writing head to create a latent magnetic image unit in a recording medium is characterized by a density which is significantly higher at the perimeter of the image unit than in the central portion thereof. This situation results directly from the fact that the outer pole portion in the head, which defines the perimeter of the image unit, has a higher permeability, and thus tends to concentrate and densify magnetic flux.

A latent image unit created in a medium, with this kind of flux density characteristic, is extremely efficient in capturing printing toner, particularly around the edge of the unit. This situation serves to enhance finally printed edge definition in an image made up of a plurality of such units. Such an image, also, is very easily read.

A specially modified head which is shown herein has a hollow central pole. This kind of structure, when writing an image, allows central lines of flux to terminate on the inside of the tube-like wall in the central pole—resulting in a central flux distribution in a written image with strong vertical toner-capturing force vectors.

These and various other objects and advantages which are attained by the invention will become more fully apparent as the description which now follows is read in conjunction with the accompanying drawings.

DETAILED DESCRIPTION OF THE INVENTION

Figure 1:
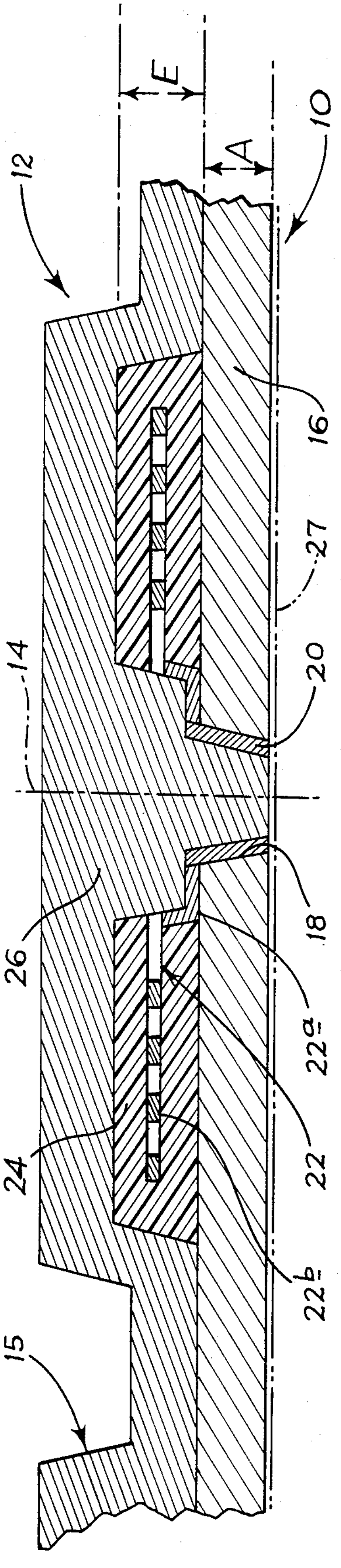
FIG. 1 is a fragmentary axial cross-sectional view illustrating one embodiment of a read/write head made in accordance with the present invention.

Turning now to the drawings, and referring first to FIG. 1, indicated generally at 10 is an electromagnetic read/write head structure including a plurality of heads, such as head 12, constructed in accordance with the present invention. Each head has what might be thought of as a thin-film, planar pancake-sandwich construction, and when viewed from the point of view of the top side of FIG. 1, has a generally circular outline. The central axis of head 12 is shown at 14. One of a plurality of heads which are adjacent head 12 is shown fragmentarily at 15.

Head structure 10 herein, only a very small portion of which is shown in FIG. 1, takes the form of a flexible web which is suitably mountable for contact with a magnetic recording medium. Further, and as will become apparent from the description which follows, structure 10 is extremely thin in cross-sectional dimensions, and is formed using thin-film and integrated-circuit fabrication techniques.

Head 12 is representative of the construction of each other writing head in structure 10. What might be thought of as the foundation carrier in structure 10 is a flexible web, or substrate, 16 formed of a suitable, high-permeability magnetic material which is also electrically conductive. According to an important feature of the present invention, the material forming web 16 has a significantly higher magnetic permeability than the other magnetic material (still to be described) used in structure 10. Two materials which, for this purpose, have been found to be extremely satisfactory are amorphous materials manufactured by Allied Chemical Company—sold under the designations 2826 MB Metglas ($Fe_{40}Ni_{38}Mo_4B_{18}$), and 2605 SE Metglas ($Fe_{81}B_{13.5}Si_{3.5}C_2$). Each of these two materials has a magnetic permeability of about 400,000 Henrys/meter. Web 16, in the region of each writing head, such as in the region of writing head 12, constitutes what is referred to herein as a second or outer magnetic pole portion. In structure 10, web 16 has a thickness shown at A in FIG. 1 of about 1.5-mils.

Formed in web 16 (in a manner which is fully described in my above-referred-to patent), and centered on axis 14, is a tapered, transfacial aperture 18 which opens to both faces of the web. The upper, larger-diameter end of aperture 18 in FIG. 1 has a dimension of about 225-microns. The lower, smaller-diameter end of the aperture has a dimension of about 125-microns.

Formed within aperture 18, and distributed about the wall therein, is a gold collar 20. Collar 20, which functions as a diamagnetic material between pole faces in head 12, extends slightly above the top surface of web 16 in FIG. 1 (as can be seen), and has a wall thickness of about 18-microns. As a consequence, the diameter at the inside of the lower end of collar 20 in FIG. 1 is about 90-microns.

As has already been mentioned, the material which makes up web 16, in addition to being an amorphous magnetic material, is also an electrically conductive material. Collar 20, in addition to functioning as a diamagnetic material which defines a low-permeability gap between pole faces in head 12, also functions to make electrical contact with web 16. The reasons for such contact will be explained later.

Electrically contacting and surrounding the upper end of collar 20 in FIG. 1 is a copper cup 22*a* which forms part of a current-carrying coil, or coil means, 22 in head 12. Also included in coil 22, and formed integrally with cup 22*a*, is a spiral winding 22*b* which is disposed substantially symmetrically about axis 14. As can be seen, winding 22*b* is substantially planar, and lies in a plane spaced somewhat above the top surface of web 16 in FIG. 1. The cross-sectional area of winding 22*b* is about 1-mil$^2$. Coil 22 is also referred to herein as an exciting means.

Figure 2:
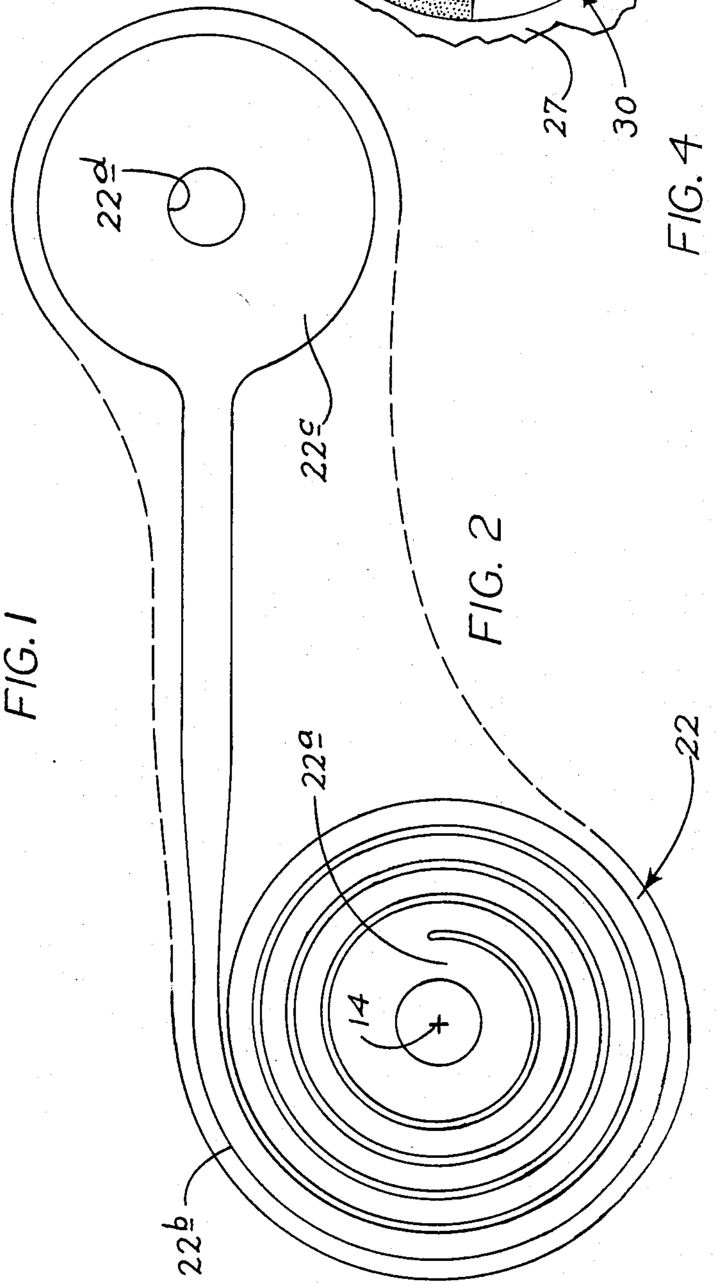
FIG. 2 is a reduced-scale view, taken from the point of view of the top side of FIG. 1, illustrating a conductive coil used in the head of FIG. 1.

FIG. 2 provides a view along axis 14 toward the top side of coil 22, with the latter removed from head 12. Here it can be seen that winding 22*b* makes, essentially, four turns about axis 14, and extends, then, tangentially a short distance away from axis 14 toward a terminating pad 22*c*. Pad 22*c* resides in substantially the same plane as winding 22*b*, and includes a central opening 22*d*, the purpose for which will be explained later.

Returning attention to FIG. 1, winding 22*b* and pad 22*c* are embedded and supported in a layer 24 of a suitable dialectric material. The thickness of this layer, shown at E, is about 26-microns. The specific material which forms layer 24 in head 12 herein is a product manufactured by E. I. Dupont deNemours & Co., sold under the name Pyralin. Another suitable product, also made by the same company, is sold under the designation PI-2555 Polyimid.

Completing a description of head structure 10, formed over the parts already described is a blanket, or blanket means, 26 of a high-permeability but non-electrically conductive magnetic material which, in structure 10, takes the form of a nickel-iron compound. According to another important feature of the invention, while the material making up blanket 26 has a relatively high permeability, this permeability is significantly lower, preferably by at least an order of magnitude, than the permeability of the material making up web 16. In head structure 10, the permeability of blanket 26 is selected to be about 5,000 Henrys/meter.

As can be seen, this blanket extends downwardly, in the central portion of the head, into cup 22*a*, and into the inside of collar 20. The projection portion of blanket 26 which fills collar 20 is referred to as an inner or first magnetic pole portion, and has a full circular bottom face in FIG. 1 which is flush with the bottom face of web 16. Blanket 26 defines the top portion of head 12 in FIG. 1, and where, like a flange relative to its projection portion, it overlies winding 22*b*, it has a generally circular configuration with a diameter of about 40-mils. This flange portion also constitutes a perimeter portion herein. Blanket 26 is also distributed over all of the other writing heads in structure 10, and performs with respect to each other head, exactly in the same manner as it does with head 12. The regions of close confrontation between the blanket and web 16 constitute magnetic connections. Suitable clearance apertures are provided in the blanket to afford electrical connection access to the central openings in the various coil terminating pads. Web 16 serves, among other things, as a common electrical connection for all coils in structure 10.

The two pole portions which have been discussed above are referred to collectively herein as magnetic pole means.

Those skilled in the art will recognize that there are various techniques which can be used to produce heads, such as head 12. One of these techniques is fully described in my above-identified U.S. patent.

Figure 3:
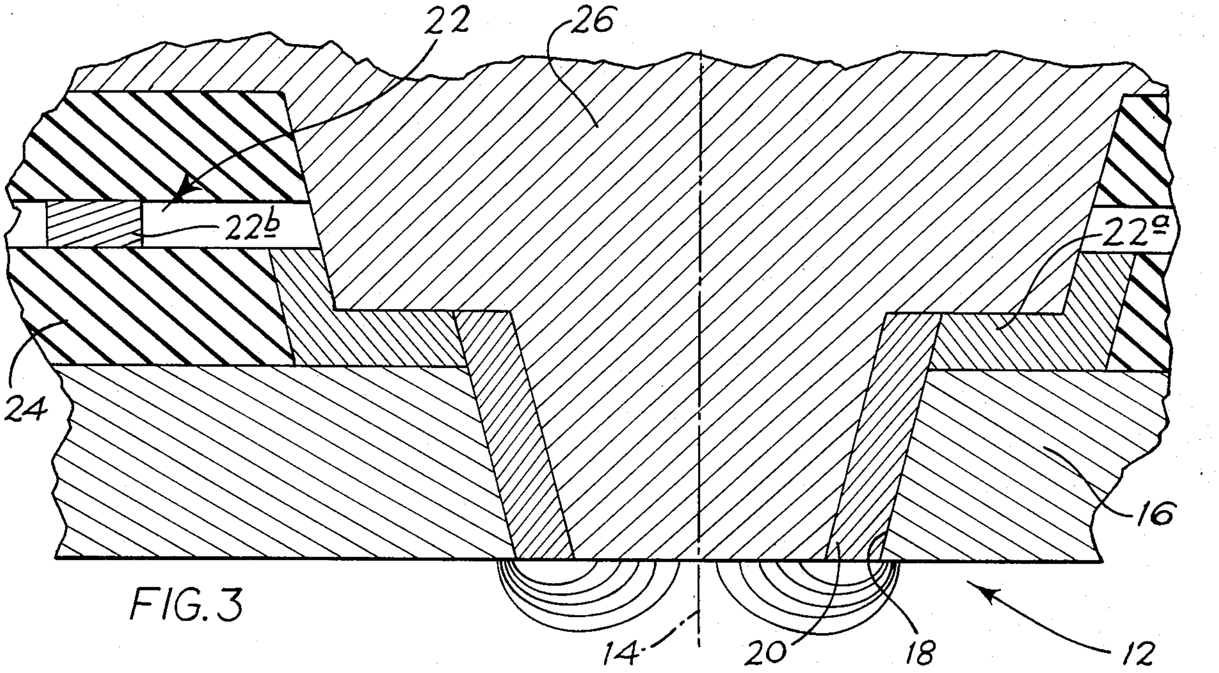
FIG. 3 (second sheet of drawings) is an enlarged fragmentary view of the base of the head of FIG. 1, illustrating a magnetic flux line pattern which is created with the head energized.

Referring now to FIG. 3, the same in greatly enlarged form illustrates the central base portion of head 12, and in particular, indicates this portion under a circumstance with the pole means therein excited by virtue of current flow in coil 22. Shown emanating from the bottom facial expanses of the two pole portions are curvilinear lines which represent lines of magnetic flux generated by the head, and displayed schematically in the plane of FIG. 3. Of particular importance to note is that these lines of flux are extremely densely packed where they extend from web 16 immediately around the perimeter portion of the base of aperture 18, and are considerably less dense where they extend from the bottom face of blanket 26 (where such appears at the base of collar 20).

Turning again to FIG. 1, indicated by dash-double-dot line 27 is a magnetic recording belt which is also referred to herein as a magnetic image-storage medium. Belt 27 is supported on a suitable conventional transport system, and is held with an upper facial expanse therein in FIG. 1 in close proximity to the underside of head 12. The space intermediate the head and the belt is referred to herein as an image-producing zone.

Figure 4:
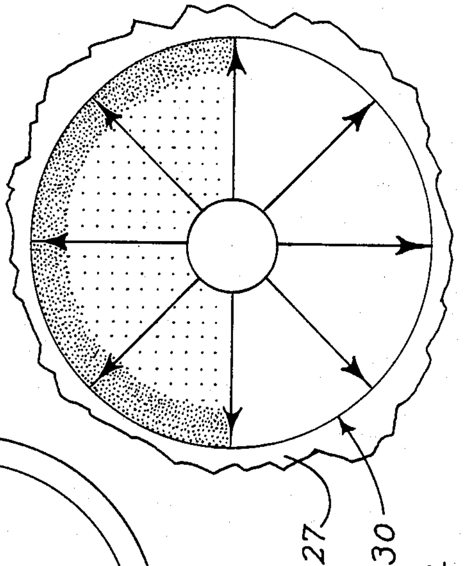
FIG. 4 is a schematic plan view of a magnetized region (image unit) which is created in a magnetic recording medium by the flux line pattern illustrated in FIG. 3.

With head 12 energized to produce magnetic flux as is illustrated in FIG. 3, the head creates, in the magnetizeable layer in belt 27, a generally annular magnetized region (image unit), such as the region shown fragmentarily at 30 in FIG. 4. Depicted, as can be seen, in FIG. 4, within this annular magnetized region, are radially extending arrows which represent magnetic vectors, and, in a portion of the region, a distribution of dots which vary in density from a high density near the perimeter of region 30 to a considerably lower density progressing toward the axis of the region. The magnetic vectors, assuming that with energization of head 12, blanket 26 assumes the condition of a north pole, and web 16 the condition of a south pole, indicate the radial nature of the magnetization which is produced in region 30. The dots which are distributed as shown are intended to illustrate the resultant recorded variation in magnetic field intensity resulting from the particular flux distribution indicated in FIG. 3.

In a typical operating situation, coil 22 is energized to produce a magneto-motive force of about 1-ampere-turn for about 1-microseconds. This, in the region of the perimeter of the base of aperture 18, produces a peak magnetic field intensity of about 1000-oersteds, and in the central "valley" region encompassed by the perimeter a minimum field intensity of about 8-oersteds.

When magnetic toner is applied in unit 30 in a printing application, preliminary to a final printing operation, such toner collects across the entirety of the unit, with a pronounced tendency for a strong build-up thereof to occur around the perimeter of the unit. This is an important result of the differential permeability characterizing this construction of the writing head of the invention.

Figure 6:
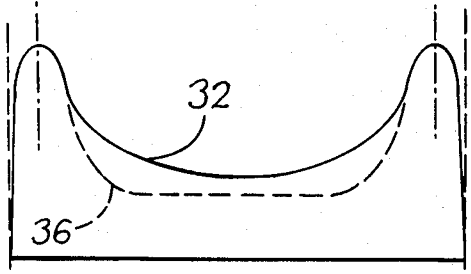
FIG. 6 is a graph illustrating, as a consequence of a writing operation for each of the heads shown in FIGS. 3 and 5, the relative levels of magnetic toner collection existing generally across the face of an image unit like that shown in FIG. 4.

Referring to FIG. 6 along with FIGS. 3 and 4, the graph of FIG. 6 is vertically aligned with FIG. 3, and shows, by soild line 32 generally the topography, so-to-speak, of magnetic toner build-up across the face of an image unit like unit 30. Here, it will be noted that such toner peaks sharply at the perimeter. Encompassed by this perimetral peak, is a valley representing a lower level of toner build-up. By way of a typical example, and considering the use of a toner whose particles are in the 20-micron size range, the perimetral peak might be expected to reach a depth of about 160-microns, and the valley a depth of about 100-microns.

Figure 5:
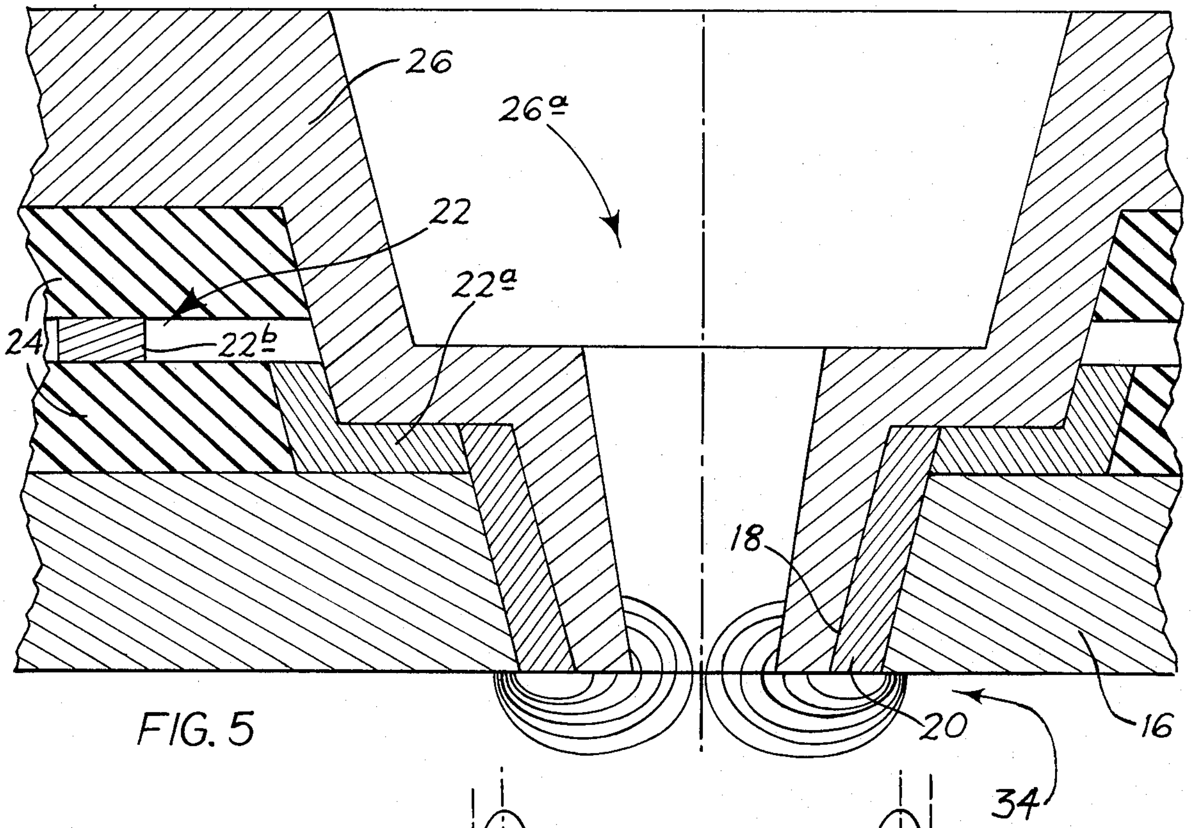
FIG. 5 is a view similar to FIG. 3 illustrating a hollow-pole modified form of a read/write head also constructed in accordance with the present invention.

Completing a description of what is shown in the drawings, and referring to FIG. 5, here there is shown at 34 a special form of a read/write head which is similar in all but one major respect to head 12. Because of this similarity, parts in head 34 which correspond to parts in head 12 have been given the same reference numerals. The only portion of head 34 which differs from head 12 is the projection portion in blanket 26 which, instead of filling cup 22*a*, is provided with a central aperture, shown at 26*a*, to make it tube-like or collar-like. The base of this projection portion terminates in an annular facial zone.

The curvilinear lines which are drawn at the base of head 34, like the curvilinear lines in FIG. 3, illustrate a pattern of flux lines resulting in the plane of FIG. 5 with the coil in head 34 energized. This pattern of flux lines is quite similar to that created by head 12, except that, across the bottom opening of aperture 26*a*, i.e., centrally in the head, the flux density, for a given level of excitation, is appreciably more uniform than that produced by head 12. This is illustrated in FIG. 6 by dashed line 36.

Studies made of images written by a head like head 34 reveal an important improvement in image quality, in that central flux is excellently uniformly distributed with strong vertical vector force components. A consequence of this situation is that such an image exhibits both excellent readability, and an excellent toner capturing ability which can yield an extremely well-filled-in, well-edge-defined, final printed image.

While two modifications of a read/write head embodying the present invention have been disclosed and described herein, it is appreciated that variations and modifications may be made without departing from the spirit of the invention.

It is claimed and desired to secure as Letters Patent:

1. In an imaging system of the type employing a magnetic image-storage medium having a magnetizable facial expanse which is placeable operatively in an image-producing zone within the system, a magnetic read/write head comprising selectively excitable thin-film magnetic pole means disposed adjacent said zone, and arranged to confront closely such a facial expanse, said pole means including inner and outer, substantially circularly symmetric pole portions characterized by different magnetic permeabilities, with that of said outer portion being greater than that of said inner portion, said pole means being excitable to produce thereadjacent a pair of opposite-polarity magnetic poles having geometries effective to establish, in such an expanse when so placed in said zone, a defined magnetized region characterized by plural, multi-directionally oriented magnetic vectors distributed generally with spherical geometry with respect to the expanse, and further characterized by a magnetic flux density in that part of the region which becomes magnetized through adjacency with said outer pole portion that is greater than that of the part of the region which becomes magnetized through adjacency with said inner pole portion, and means operatively connected to said pole means for exciting the same.

2. The head of claim 1, wherein said inner pole portion has a substantially full-circular facial expanse, and said outer pole portion has a substantially annular facial expanse symmetrically surrounding said inner pole portion.

3. The head of claim 1, wherein said inner and outer pole portions each has a substantially annular facial expanse, with that of said outer pole portion symmetrically surrounding that of said inner pole portion.

4. In an imaging system of the type usable with a generally sheet-like magnetic image-storage medium which is placeable operatively in an image-producing zone within the system, thin-film apparatus for producing in such a medium, when so placed in said zone, an image portion, with such taking the form of a defined magnetized region in the medium, such region being characterized by multi-directionally oriented magnetic vectors extending both at different angles substantially within the plane of the medium, and at different angles across such plane, said apparatus comprising a first pole portion having one magnetic permeability disposed adjacent said zone excitable to define a first magnetic pole expanse of one polarity arranged to confront closely one face of a medium placed within the zone, a second pole portion having another magnetic permeability which is greater than said one permeability disposed adjacent said zone excitable to define, with respect to said first pole expanse, a related second pole expanse of the opposite polarity, said second pole expanse generally symmetrically surrounding said first pole expanse, and being arranged to confront closely the same face of a medium placed within the zone, and means operatively connected to said first and second pole portions for exciting the same.

5. The apparatus of claim 4, wherein said first pole portion has a substantially full-circular facial expanse, and said second pole portion has a substantially annular facial expanse symmetrically surrounding said first pole portion.

6. The apparatus of claim 4, wherein said first and second pole portions each has a substantially annular facial expanse, with that of said first pole portion symmetrically surrounding that of said second pole portion.

7. A hollow pole, thin-film, electromagnetic, read/write head structure comprising a thin-film, magnetically permeable substrate including an aperture and having one magnetic permeability, magnetically permeable blanket means, having a lower permeability than said one permeability operatively associated with said substrate including a magnetically hollow, generally tube-like projection portion extending in spaced relation into said aperture, and a flange portion extending in spaced confronting relation over a portion of one face of said substrate surrounding said aperture, and spiral coil means surrounding said projection portion and disposed in the space between said substrate's said one face and said flange portion.

8. A generally planar, hollow-pole, electromagnetic, read/write head structure for reading/writing a magnetic image along an axis substantially normal to the plane of the structure, said head structure comprising a thin-film, magnetically permeable substrate including an aperture, thin-layer, magnetically permeable blanket means distributed with one portion extending in spaced relation over a portion of one face of said substrate surrounding said aperture, and another projection portion extending in a hollow tube-like form in spaced relation within said aperture, and thin-layer coil means distributed as a sprial winding surrounding said projection portion in the space between said substrate's said one face and said blanket means' said one portion.

9. A flexible, generally planar, hollow-pole thin-film, electromagnetic read/write head structure comprising a flexible, magnetically permeable, sheet-like substrate including an aperture which extends transfacially through the substrate with a perimeter portion on one face of the substrate exitable to define thereon one magnetic pole in the head structure, magnetically permeable blanket means distributed adjacent and in spaced relation over the other face in said substrate generally axially symmetrically with respect to said aperture, including a perimeter portion magnetically coupled to said substrate's said other face, and a magnetically hollow, generally ring-like collar portion extending in spaced axial relationship into and through said aperture and terminating in an annular facial zone which is substantially coplanar with said other face, excitable to define adjacent said other face another magnetic pole in the head structure, and thin-film, general planar, spiral coil means substantially symmetrically surrounding said collar portion and distributed in the interface region between said substrate's said one face and said perimeter portion energizable to excite said two poles.

10. A generally planar, thin-film, hollow-pole electromagnetic, read/write head structure comprising a magnetically permeable, sheet-like substrate including a transfacially extending aperture, generally planar conductive coil means disposed adjacent one face of said substrate in a manner circumferentially surrounding said aperture, and magnetically permeable blanket means distributed generally over said coil means on said substrate's said one face, including a perimeter portion magnetically coupled to said one face outside of said coil means, and an elongated, magnetically hollow collar portion spaced from and extending axially into said aperture, and terminting in a ring-like end exposed in said aperture adjacent said substrate's other face, said coil means being energizable to produce magnetic flux in said substrate and blanket means, with said ring-like end forming one magnetic pole in the head structure, and a region immediately surrounding said aperture on the substrate's said other face forming an opposite magnetic pole in the structure.

* * * * *